United States Patent
Ben Ami et al.

(10) Patent No.: US 10,848,381 B2
(45) Date of Patent: Nov. 24, 2020

(54) CROSS-DOMAIN SERVICE OPTIMIZATION

(71) Applicant: Cisco Technology, Inc., San Jose, CA (US)

(72) Inventors: Alon Ben Ami, Gedera (IL); Sangeeta Ramakrishnan, Saratoga, CA (US); Vladimir Yanover, Kfar Saba (IL); Ziv Nuss, Tsur Yigal (IL); Ron Zafrir, Kfar Sirkin (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 624 days.

(21) Appl. No.: 15/442,734

(22) Filed: Feb. 27, 2017

(65) Prior Publication Data

US 2017/0264488 A1    Sep. 14, 2017

Related U.S. Application Data (60) Provisional application No. 62/442,000, filed on Jan. 4, 2017, provisional application No. 62/305,577, filed on Mar. 9, 2016.

(51) Int. Cl.
*H04L 12/24*    (2006.01)
*H04W 24/08*    (2009.01)
(Continued)

(52) U.S. Cl.
CPC ...... *H04L 41/0823* (2013.01); *H04L 41/5009* (2013.01); *H04L 41/5067* (2013.01);
(Continued)

(58) Field of Classification Search
CPC ..... H04L 41/0823; H04L 67/34; H04L 67/12; H04L 41/5067; H04L 41/509;
(Continued)

(56) References Cited

U.S. PATENT DOCUMENTS

2012/0278430 A1*    11/2012    Lehane ............... H04L 41/5054
                                                       709/217
2013/0254341 A1    9/2013    Ramakrishnan
(Continued)

FOREIGN PATENT DOCUMENTS

WO    2016/026509    2/2016
WO    2016020917 A1    2/2016
(Continued)

OTHER PUBLICATIONS

Brune, Peter et al.; Network Slicing a Key Concept for 5G (2015); Deutsche Telekom AG, Group CTO.
(Continued)

*Primary Examiner* — Kim T Nguyen (57) ABSTRACT

A method for cross-domain service optimization is implemented on a computing device and includes defining at least one key quality indicator (KQI) target for at least one end-to-end (E2E) service, where the at least one E2E service crosses more than one domain of a communications network, receiving an indication of quality of experience (QoE) for the at least one E2E service, based on the indication of QoE, translating the at least one KQI target to at least one set of service optimization instructions for each domain from among the more than one domain, and for each domain, applying the service optimization instructions.

20 Claims, 8 Drawing Sheets

(51) Int. Cl.
*H04L 29/08* (2006.01)
*H04W 28/02* (2009.01)
*H04W 72/04* (2009.01)
*H04W 28/08* (2009.01)

(52) U.S. Cl.
CPC .............. *H04L 67/12* (2013.01); *H04L 67/34* (2013.01); *H04W 24/08* (2013.01); *H04W 28/0268* (2013.01); *H04W 72/0493* (2013.01); *H04L 41/5006* (2013.01); *H04L 41/509* (2013.01); *H04L 41/5019* (2013.01); *H04L 41/5087* (2013.01); *H04W 28/08* (2013.01)

(58) Field of Classification Search
CPC .............. H04L 41/5087; H04L 41/5006; H04L 41/5019; H04L 41/5009; H04W 72/0493; H04W 28/0268; H04W 28/08; H04W 24/08
See application file for complete search history.

(56) References Cited

U.S. PATENT DOCUMENTS

| | | |
|---|---|---|
| 2014/0031006 A1 | 1/2014 | Moore et al. |
| 2014/0155081 A1 | 6/2014 | Nuss et al. |
| 2014/0243005 A1 | 8/2014 | Yanover et al. |
| 2014/0269269 A1 | 9/2014 | Kovvali et al. |
| 2015/0071075 A1 | 3/2015 | Ramakrishnan |
| 2016/0028594 A1 | 1/2016 | Ramakrishnan et al. |
| 2016/0028595 A1 | 1/2016 | Ramakrishnan et al. |
| 2016/0028647 A1 | 1/2016 | Ramakrishnan et al. |
| 2016/0028651 A1 | 1/2016 | Ramakrishnan et al. |
| 2016/0344606 A1* | 11/2016 | Baccarani .......... H04L 41/5067 |

FOREIGN PATENT DOCUMENTS

| | | | |
|---|---|---|---|
| WO | WO-2016020917 A1 * | 2/2016 | ............ H04W 24/02 |
| WO | WO-2016026509 | * 2/2016 | |

OTHER PUBLICATIONS

Ericsson; NGMN Terminology and Conceptual Outline for Network Slicing (SA WG2 Meeting #113 Document No. S2-160162), 2016, release NexGen/Rel-14).
Examination Report in counterpart European Application No. 17 710 404.9, dated Jul. 4, 2019, 10 pages.
Partial Search Report, dated Jun. 30, 2017, in a counterpart WO application (PCT/IB2017/051124).
International Search Report and Written Opinion, dated Sep. 11, 2017, in a counterpart WO application (PCT/IB2017/051124).
Examination Report in counterpart European Application No. 17710404. 9, dated Dec. 6, 2019, 21 pages.

* cited by examiner

CROSS-DOMAIN SERVICE OPTIMIZATION

RELATED APPLICATION INFORMATION

The present application claims the benefit of priority from U.S. Provisional Patent Application, Ser. No. 62/305,577, filed on Mar. 9, 2016, and from U.S. Provisional Patent Application, Ser. No. 62/442,000, filed on Jan. 4, 2017.

FIELD OF THE INVENTION

The present invention generally relates to the optimizing of end-to-end (E2E) service performance across multiple network domains.

BACKGROUND OF THE INVENTION

Self-optimizing networks (SONs) are known in the art. In the area of radio access networks (RANs), a SON is typically implemented as a closed loop optimizer that is tasked with the optimization of key performance indicators (KPIs) that reflect the performance of one or more radio access technologies (RATs), typically deployed using products from multiple vendors.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A method for cross-domain service optimization is implemented on a computing device and includes defining at least one key quality indicator (KQI) target for at least one end-to-end (E2E) service, where the at least one E2E service crosses more than one domain of a communications network, receiving an indication of quality of experience (QoE) for the at least one E2E service, based on the indication of QoE, translating the at least one KQI target to at least one set of service optimization instructions for each domain from among the more than one domain, and for said each domain, applying the service optimization instructions.

A method for video content service optimization in a mobile network includes: defining at least one key quality indicator (KQI) target for a video content cross-domain service, where the at least one E2E service is provided across at least a radio access network (RAN) domain and an evolved packet core (EPC) domain, and the KQI target is associated with a service level agreement (SLA) for the video content delivery to at least a first user equipment (UE), receiving an indication of insufficient quality of experience (QoE) for the video content E2E cross-domain video delivery service provided to the at least a first UE in a first cell of the mobile network, where the indication indicates noncompliance with the SLA, and reallocating radio resources from at least a second UE to the first UE.

Detailed Description of Example Embodiments

Figure 1:
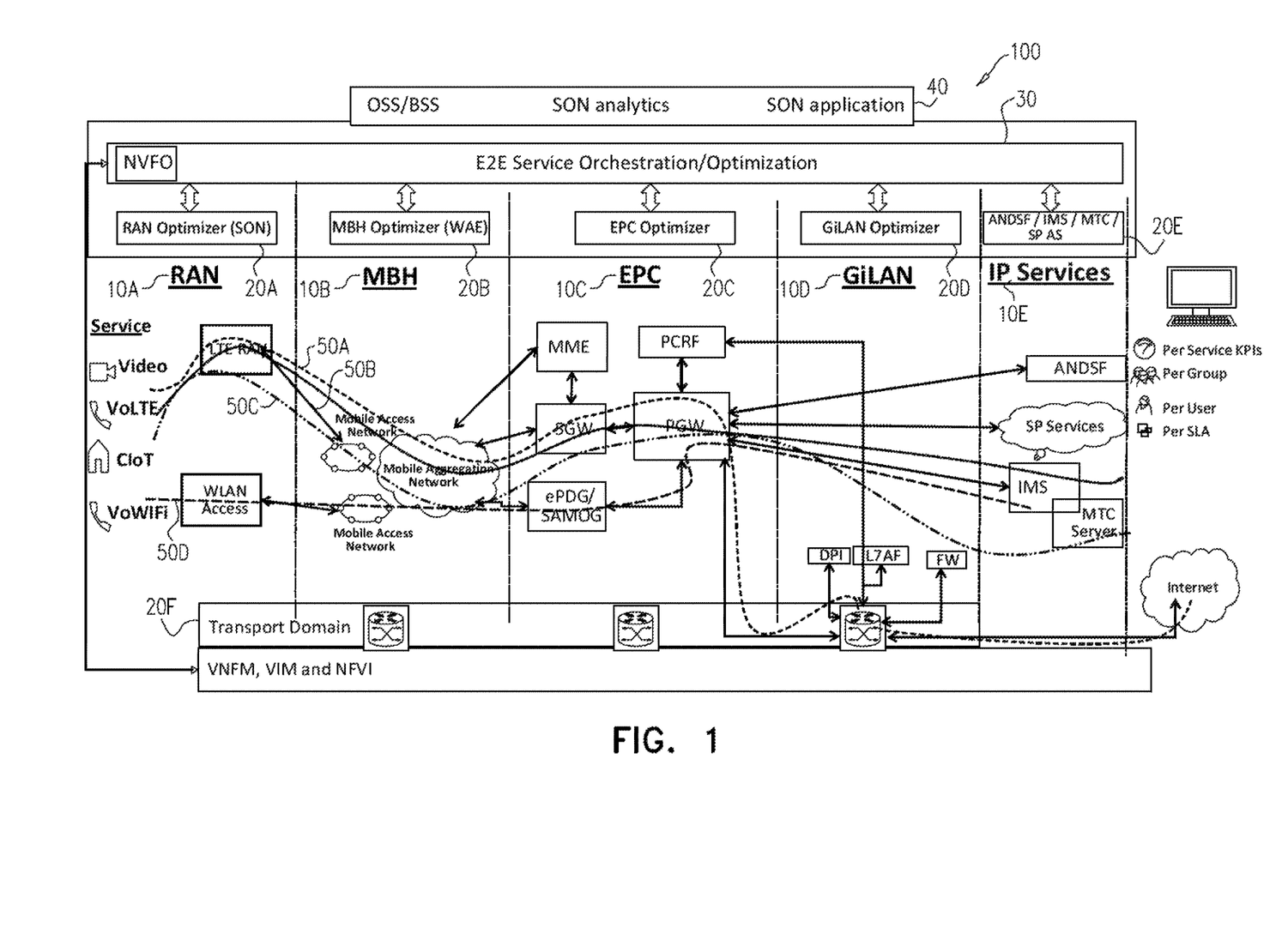
FIG. 1 is a schematic illustration of a multi-domain service optimizer (MDSO) architecture, configured and operative in accordance with embodiments of the disclosure.

Reference is now made to FIG. 1 which is a schematic illustration of an exemplary multi-domain service optimizer (MDSO) architecture 100, constructed and operative in accordance with embodiments described herein. It will be appreciated that mobile service operators typically provide services that are supported by more than one network domain. For example, as illustrated in FIG. 1, architecture 100 comprises network domains 10A (RAN), 10B (Mobile Back Haul—MBH), 10C (Evolved Packet Core—EPC), 10D (GiLAN), and 10E (IP Services). Services such as video, voice over LTE (VoLTE), CIoT (cellular Internet of Things), and/or voice over WiFi (VoWiFi) may be carried over multiple such domains 10. For example, video service 50A may be supported by all of domains 10A-E. As shown in FIG. 1, VoLTE service 50B may be supported by Domains 10A and 10B; CIoT service 50C and VoWiFi service 50D may be supported by domains 10A, 10B, 10C and 10E.

It will be appreciated that the architecture of FIG. 1 may be therefore disposed towards the orchestration and/or optimization of virtual sub-networks known as "network slices", where the virtual sub-network is differentiated in accordance with a variety of criteria such as, for example, the network components that may be used to provide a type of service, (e.g., video call) to a user terminal.

In addition to the service, other criteria that may be used to define a network slice include, either singly or in combination:

User terminal type; e.g., IoT

Type and/or properties of services to be provided within the slice, e.g., low latency connections for connected vehicles User terminal location; e.g.:
i. Physical location
ii. Attachment to a particular sub-set of domain 10 such as a RAN or core network domain. Sub-sets of a RAN may be defined, for example, according to the different Radio Access Technologies (RATs) in use in the RAN.
iii. Attachment to a particular wireless local area network (WLAN), such as an enterprise WLAN.

The architecture of FIG. 1 may therefore provide an architecture for slicing-aware network management, orchestration, and optimization of end-to-end user services in a mobile network that would allow service management, orchestration, and optimization across mobile network domains such as RAN, and Core. The architecture may also be sufficiently robust to provide similar functionality to domains that historically may not have been considered a part of mobile network, such as the Application, Transport, Gi-LAN ("Gi-LAN", also known as "SGi-LAN", represents the IP network infrastructure immediately on the PDN side of the SGi reference point defined in 3GPP) and WLAN domains. The architecture may also support slicing-aware service orchestration and allow natural extension when new domains are added by the network operator.

The architecture may include the following components which may be organized into functional levels as follows:

Level A: Network Domains 10 such as RAN, MBH, Core, EPC, Gi-LAN, WLAN, Transport, NFVI (Virtualized Infrastructure domain), Other-RAT, IP Services, etc. Network Domains 10 may include Network Elements such as MME, ePDG etc. as shown in FIG. 1. It will be appreciated that in the interests of clarity, FIG. 1 may not depict every type of existing network domain that may be included in such an architecture.

Level B: Domain specific controllers or optimizers such as RAN Optimizer 20A (e.g., RAN SON); MBH Controller (Optimizer 20B); EPC Optimizer 20C (e.g., policy and charging rules function PCRF); GiLAN Optimizer 20D; IP services optimizer 20E; etc. It will be appreciated that while FIG. 1 does not explicitly depict domain controllers, architecture 100 may also comprise domain controllers used by optimizers 20 to collect network performance data and apply configuration changes in various network domains 10. Accordingly, for each domain optimizer disclosed herein, it may be appreciated that in accordance with at least some embodiments, a domain controller may also be implemented, alternatively, or in addition.

Level C: E2E Service Orchestration/Optimization level 30 that may include, for example, SON analytics and SON applications.

Level D: may include one or several of the following: OSS/BSS, SON analytics, and SON applications. This level sets optimization goals such as specific values of E2E service KQIs.

The types of information carried over the interfaces between these layers may include, for example, performance measurements (PMs), fault management (FM) notifications, and control/configuration information.

The PMs and FM notifications represent aggregated and/or non-aggregated measurements and correlated or non-correlated alarms and their derivatives that may be generated by the network domains 10. This information typically goes in an "upward direction", i.e., from Level A to Level B and beyond.

In contrast, control/configuration information typically flows "downward" towards Level A. A typical flow of such information may be characterized as follows:

Level D applications provide control/configuration information that characterizes an E2E service 50 to the E2E Service Orchestration/Optimization level 30 (Level C).

Level C translates the information received from Level D to domain specific information that is provided to each of the relevant Level B domain controllers/optimizers 20.

Level B provides the information to the appropriate Level A domains, optionally with customized vendor-specific properties.

In accordance with embodiments described herein, the E2E Service Orchestration/Optimization level may be operative to:

Receive PM and FM notifications that are service specific and domain specific.

Optionally generate additional PM and FM data and deliver service specific PM and FM notifications via its "northbound interface", i.e., upward to Level D. It will be appreciated that pull and pub/sub types of operations may be supported.

Transfer domain specific and service specific PM and FM notifications between levels and between domains. It will be appreciated that pull and pub/sub types of operations may be supported.

In various domains, configure the domain-specific service components through the domain controllers.

Run analytics to compute certain KPIs and/or key quality indicators (KQIs) and preferred/optimal configuration parameters to be effected in particular domains.

Optionally act in accordance with the results of the analytics, e.g., to reconfigure the service components and/or network elements in certain domain 10 if there is a problem in another domain 10, as per the computed KPIs or KQIs.

Accordingly, the disclosed architecture differs from an existing 2G/3G/4G optimization paradigm in the following: First, the optimization target is set in terms of E2E service performance. Second, in existing 2G/3G/4G mobile network architecture, service management typically flows from top levels like OSS/BSS to the Core Network which contains nodes responsible for service configuration, such as Home Subscriber Server (HSS) or PCRF. Then, driven by certain network events, such as attachment of the mobile to the network, the service is established/configured by the Core Network towards the RAN. After that no further service assurance or optimization happens. In contrast, the suggested approach includes service management/orchestration/optimization levels that go across the network domains (particularly the core network and RAN) and provide for E2E service management, orchestration and optimization through all domains. The advantages of such approach are as follows:

The service management/orchestration level may access any domain separately to configure/establish/define policies for any existing or planned service in any domain or combination of domains. Activation of the policies can be triggered, among other things, by a network event such as network attach, or status change (e.g. overload, NFVI failure) in a given domain.

It will be appreciated that this may provide for more flexibility of service definition/policies; for example, RAN policies may be modified independently from Core Network policies that are applied to the same service.

This approach may also allow for progressive integration of new network domains into the service management system, e.g. transport domain, WLAN etc. Similarly, new types of services may be easily and quickly configured across multiple domains.

Figure 2:
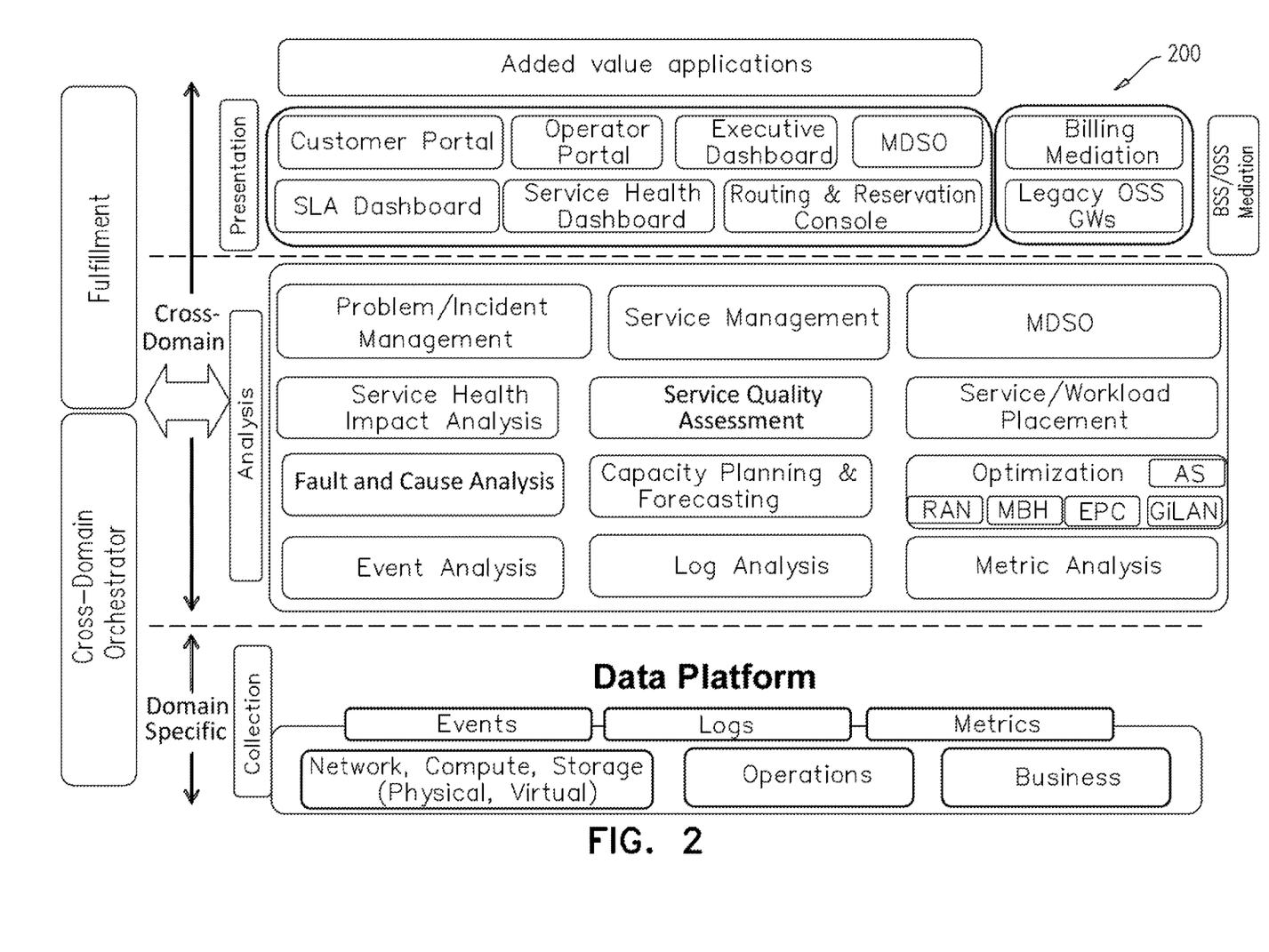
FIG. 2 is a schematic illustration an exemplary implementation of the MDSO architecture of FIG. 1 as implemented within the context of the New Generation Operations Support System (NGOSS) business solution framework.

Reference is now made to FIG. 2, which illustrates an exemplary implementation of the MDSO architecture 200 as implemented within the overall framework of the New Generation Operations Systems and Software (NGOSS) business solution framework developed by the TM (Tele-Management) Forum.

Figure 3:
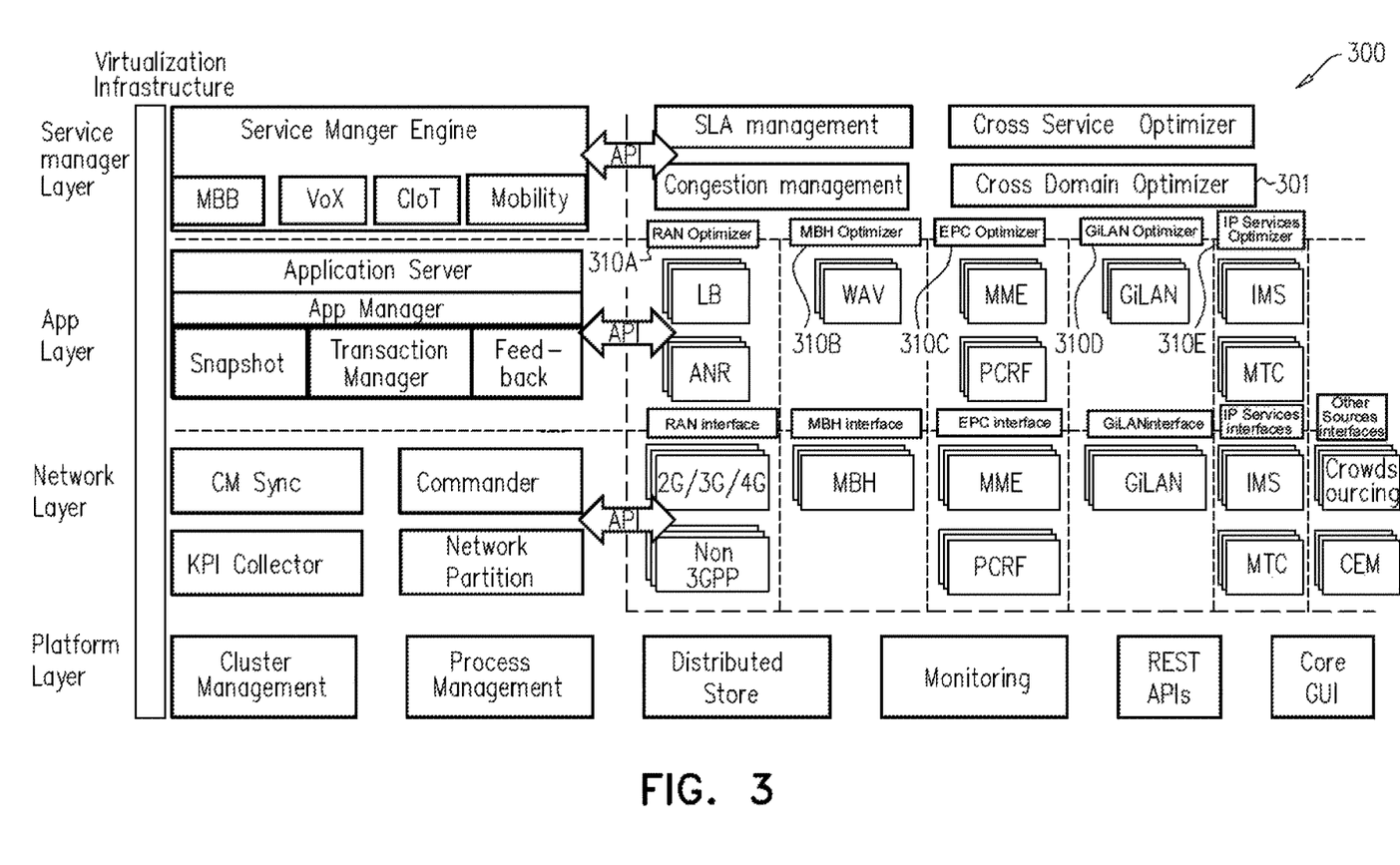
FIG. 3 is a schematic illustration of an exemplary software architecture for the MDSO architecture of FIG. 1.

Reference is now made also to FIG. 3 which illustrates an exemplary software system architecture 300 for MDSO.

It will be appreciated by a person of ordinary skill in the art that the MDSO may be based on, and integrated with, currently used platforms to define a E2E service optimization functionality which is based on domain optimizers 20 and data sources which enable the MDSO to optimize which may be defined as per service, per network slice, per location, per user group, per user, etc. It will therefore be appreciated that the MDSO may not be a domain optimizer per se, but rather it is a service quality of experience (QoE) and service level agreement (SLA) optimizer. Accordingly, in order to attain optimal service performance it may be empowered to induce sub-optimal domain performance. The MDSO may manage a given domain optimizer in the context of meeting E2E service requirements as opposed to meeting domain-specific requirements.

It will similarly be appreciated that the MDSO is platform agnostic and can and may run in virtual platform, in physical platform, with external data collection entity or use its own data collectors and/or combinations thereof of data sources.

In accordance with embodiments described here, an MDSO architecture may be implemented to provide an E2E, cross-domain, video-aware, self-optimizing network service. In operation, existing SONs (e.g., RAN optimizer 20A from FIG. 1) monitor the performance of the RAN network (e.g., network domain 10A from FIG. 1), specifically radio network elements in order to identify poorly performing network elements based on KPIs. After identifying such elements, the SON runs one of several algorithms as part of a decision making process, and then, based on the decision, triggers action on one or more network elements. The SON thereby delivers gains in operational efficiencies and utilization efficiency of the network and spectrum resources, as well as end user experience.

Video traffic as a percentage of mobile traffic is increasing. Currently, the vast majority of this video traffic is streaming video, using HTTP Adaptive streaming.

Traditional SON solutions typically lack service awareness, i.e., a SON may attempt to optimize Internet Protocol (IP) data traffic for a cell or group of cells without knowledge of what services are being provided with the traffic being optimized. SON systems may be enhanced by adding video service QoE awareness by exposure to the management system of the data of service quality of experience (QoE) metrics (e.g. video quality). In accordance with embodiments described herein, such enhancement may facilitate user level actions via policy control to improve the network utilization and fairness across video users. It will be appreciated that such enhancements may rely on direct measurements of video quality from service provider and client ends rather than from RAN infrastructure alone.

By adding video service awareness to the SON, the SON may improve load balancing decisions to better utilize the network resources. Awareness of video may enable the SON to account for video QoE when making load balancing decisions. Such awareness may be facilitated by measuring video QoE, correlating the video QoE with network topology, and making the video QoE available to the SON application. The SON application may then take the video QoE into account when making its optimization decisions. Video QoE may also be used to measure the effectiveness of existing SON load-balancing actions and/or serve as part of a feedback loop. An exemplary list of SON optimization decisions that may benefit from video awareness include: inter-carrier load balancing (ICLB), inter-RAT load balancing (IRLB), and Capacity and Coverage Optimization (CCO), all of which may leverage video service awareness to further improve decisions.

The video service aware SON as the network management entity will have visibility to users' QoE and to cell/cluster congestion levels. Based on a load metric (e.g. number of users), the SON may select whether to trigger an appropriate load balancing mechanism, and/or to modify policy control on selected video users that consume excessive amounts of bandwidth.

Figure 4:
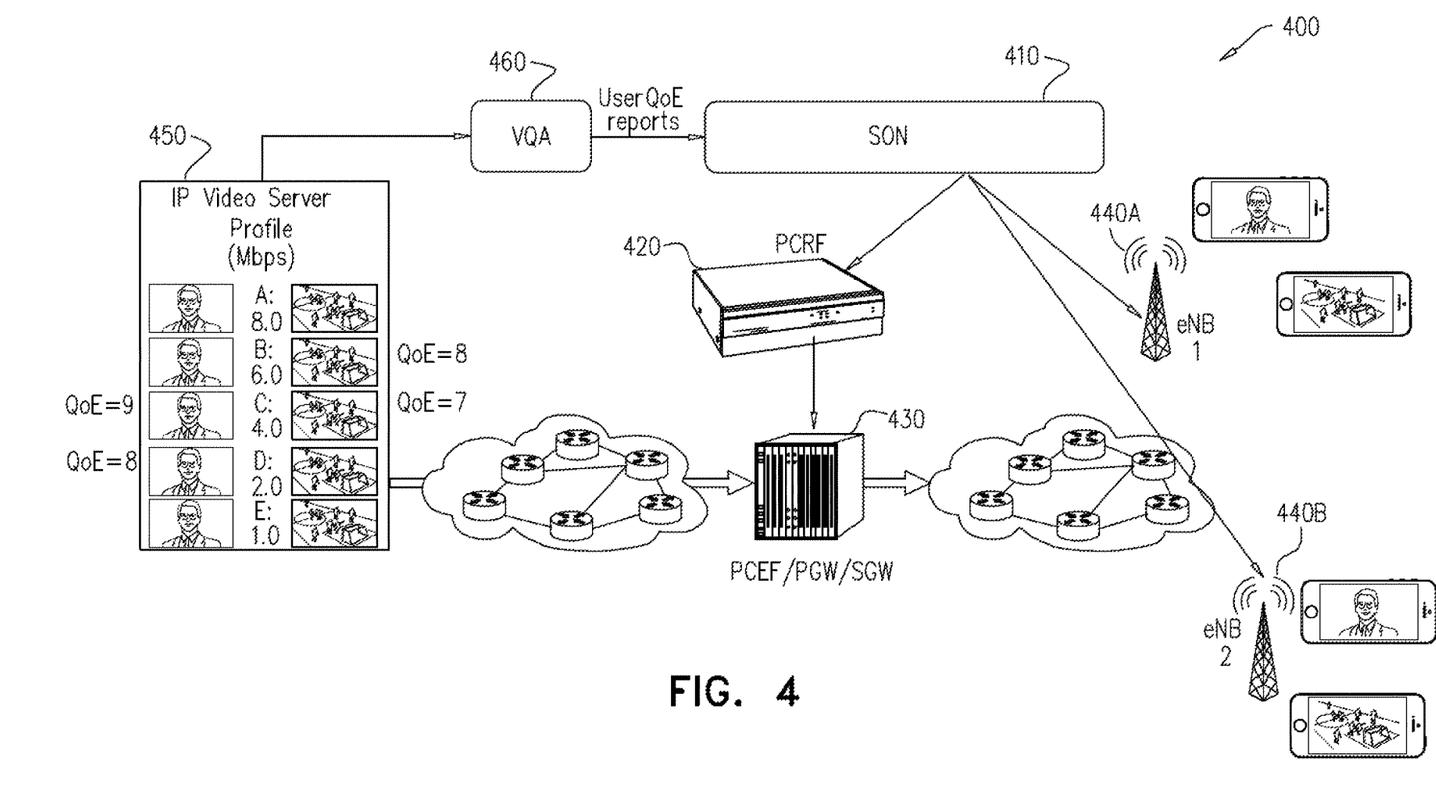
FIG. 4 is a schematic illustration of an exemplary video aware SON, configured and operative in accordance with embodiments of the disclosure.

Reference is now made to FIG. 4 which is a schematic illustration of a video aware SON environment 400, constructed and operative in accordance with embodiments described herein. It will be appreciated that as described hereinabove, mobile service operators typically provide services that are supported by more than one network domain. For example, as depicted in FIG. 4, in addition to voice services, user equipments (UEs) may also receive video services.

SON application 410 may be implemented E2E Service Orchestration/Optimization level 30 as described with respect to FIG. 1. In operation, SON application 410 may query a video QoE analytics application (VQA) 460 about QoE for UEs that are in cells that are of interest (e.g., cells 440A and 440B. The UEs may be identified, for example, according to international mobile subscriber identity (IMSI) or any other suitable means known in the art.

In one embodiment, VQA 460 may monitor operations of IP video server 450 as it provides video services to the UEs. VQA 460 may provide the requested Video QoE information as per performance data on IP video server 450. The Video QoE information may include metrics such as, for example, average bitrate achieved by video client UE, ideal bit rate for the client UE, video stall time, perceptual video quality achieved by client UE, etc. It will be appreciated that VQA 460 itself may take individual or group subscriber video policies into account when reporting QoE metrics.

SON application 410 may aggregate the Video QoE information across UEs in the same cell 440 (e.g., cells 400A and 440B), to detect cells 440 experiencing poor Video QoE. In accordance with embodiments described herein, the Video QoE information may also be used to determine which type of load balancing action to apply to the cell(s) with poor QoE, e.g., ICLB, or IRLB. Once the type of load balancing technology is selected, the Video QoE information may be further used to determine, for example, which cells 440 to expand and which cells 440 to shrink in order to remedy the poor Video QoE. For example, cells 440 with poor Video QoE may be shrunk so that UEs at the edge of that cell may be effectively directed to connect to a less loaded neighboring cell.

In accordance with embodiments described herein, SON application 410 may address poor aggregate Video QoE via changes in the policy and charging rules function (PCRF) 420. Changes dictated by PCRF 420 may be enforced on offending UEs by the Policy and Enforcement Function (PCEF) 430 and/or a gateway such as, for example, a serving gateway (SGW) 430 or packet data network gateway (PGW) 430.

Figure 5:
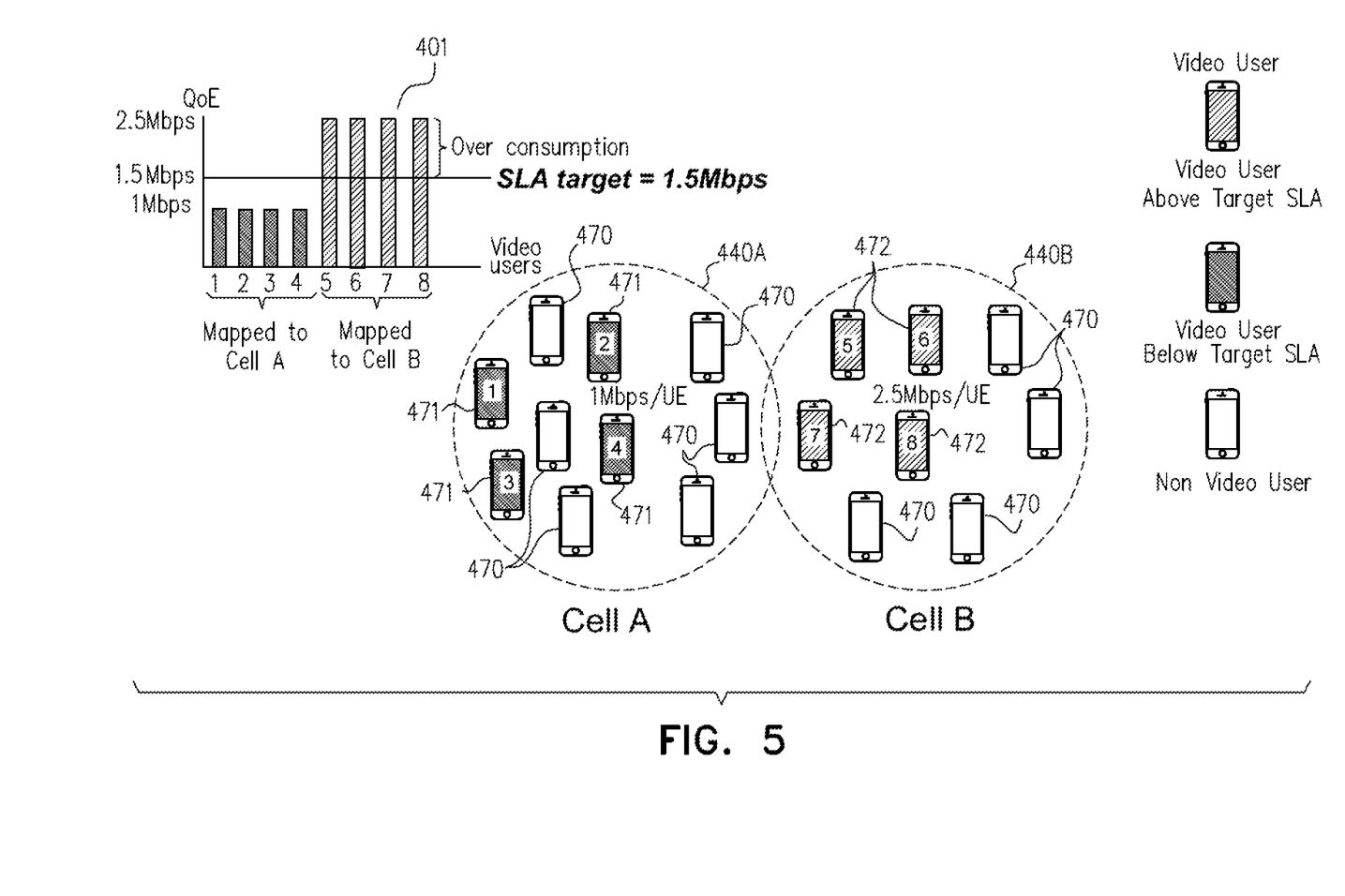
FIGS. 5 and 7 are schematic illustrations of mobile cells with problematic video service.

Reference is now made to FIG. 5 which illustrates two cells 440 in an exemplary network, where a service level agreement (SLA) has been set to provide video consuming UEs with at least 1.5 Mbps. The video content may be provided to the UEs by a content distribution network (CDN), where the download rates of the individual users are shown in download rate graph 401. As per the exemplary embodiment of FIG. 5, video users 1, 2, 3, and 4 using UEs 471 in cell 440A are receiving a download rate of only 1 Mbps, whereas video users 5, 6, 7, and 8 using UEs 472 in cell 440B are receiving 2.5 Mbps. It will be appreciated that the users of UEs 470 are not currently downloading video content.

Figure 6:
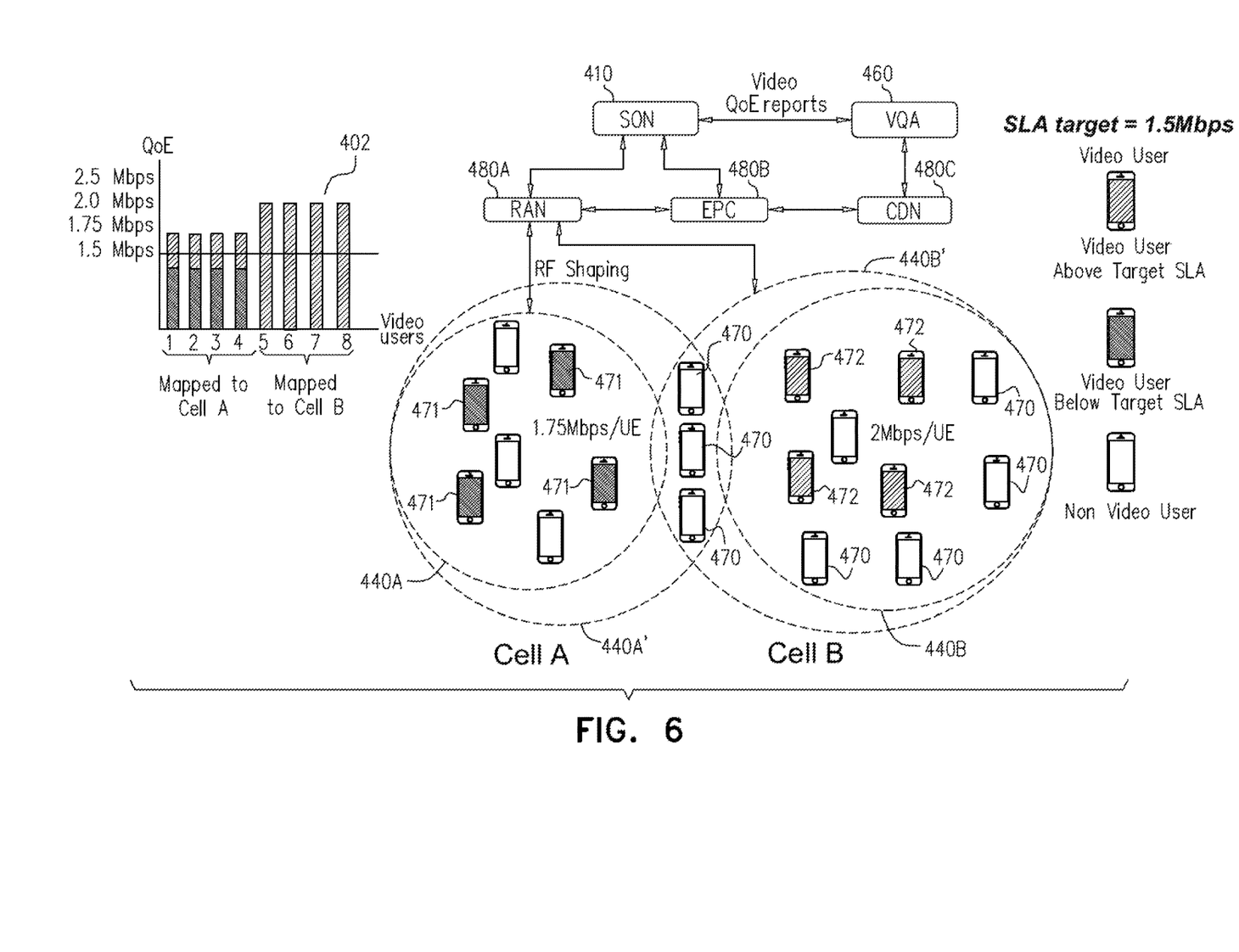
FIGS. 6 and 8 are schematic illustrations of the mobile cells of FIGS. 2 and 4 as optimized by the system of FIG. 4.

As depicted in FIG. 6, to which reference is now made, based on the Video QoE information, SON application 410 may detect the poor video quality being experienced by UEs 471 in cell 440A.

In accordance with embodiments described herein, SON application 410 may reshape cells 440A and 440B in order to steer some UEs 470 from cell 440A to cell 440B in order to improve QoE for the remaining UEs 470 and 471 in the now reshaped cell 440A, herein denoted as cell 440A'. Specifically, the range of cell 440B may be increased to compensate for a decrease in the range of cell 440A. As a consequence, some of the UEs 470 previously served by cell 440A will be steered to reshaped cell 440B, herein denoted as cell 440B'.

The steering effectively reduces load on cell 440A' and may release resources to UEs 471, which, as shown in download rate graph 402, may now benefit from improved Video QoE (rates) as a result. In cell 440B', SON application 410 may validate that the users in Cell 440B' are still benefiting from an acceptable QoE (above SLA). For example, as shown in download rate graph 402, UEs 472 may now share resources with the offloaded UEs 470 from Cell 440A, thereby lowering their download rate. However, SON application 410 may calibrate the shaping of the cells 440' to ensure that the QoE in cell 440B' still meets or exceeds the SLA rate.

Figure 7:
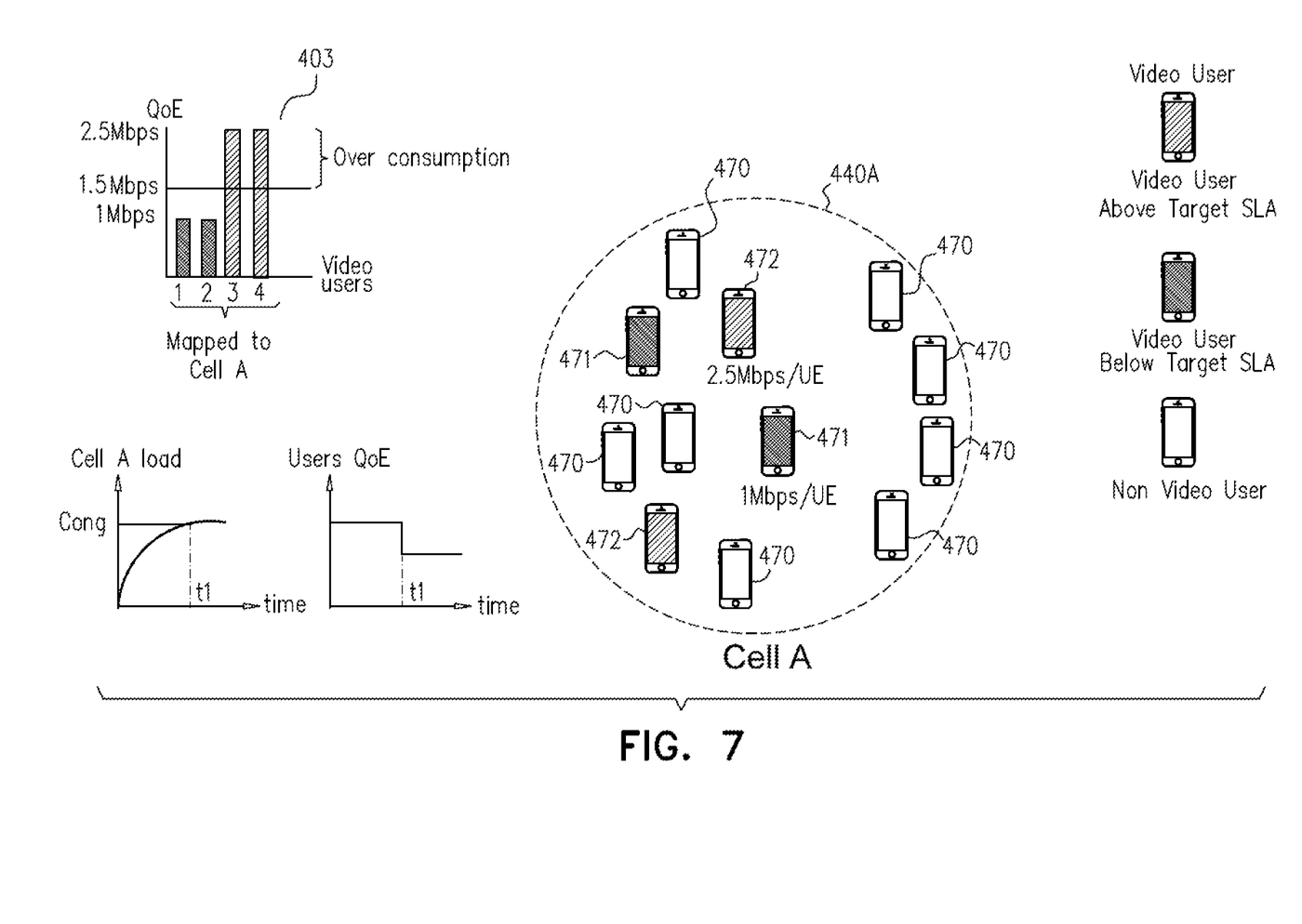

Reference is now made to FIG. 7, which illustrates cell 440A in a similarly configured exemplary network, where an SLA has been set to provide video consuming UEs with at least 1.5 Mbps. As depicted in the exemplary embodiment of FIG. 5, cell 440A may be experiencing at least partial video traffic congestion: as shown in download rate graph 403 two UEs 471 are receiving a download rate of only 1 Mbps, while two UEs 472 are receiving 2.5 Mbps.

Figure 8:
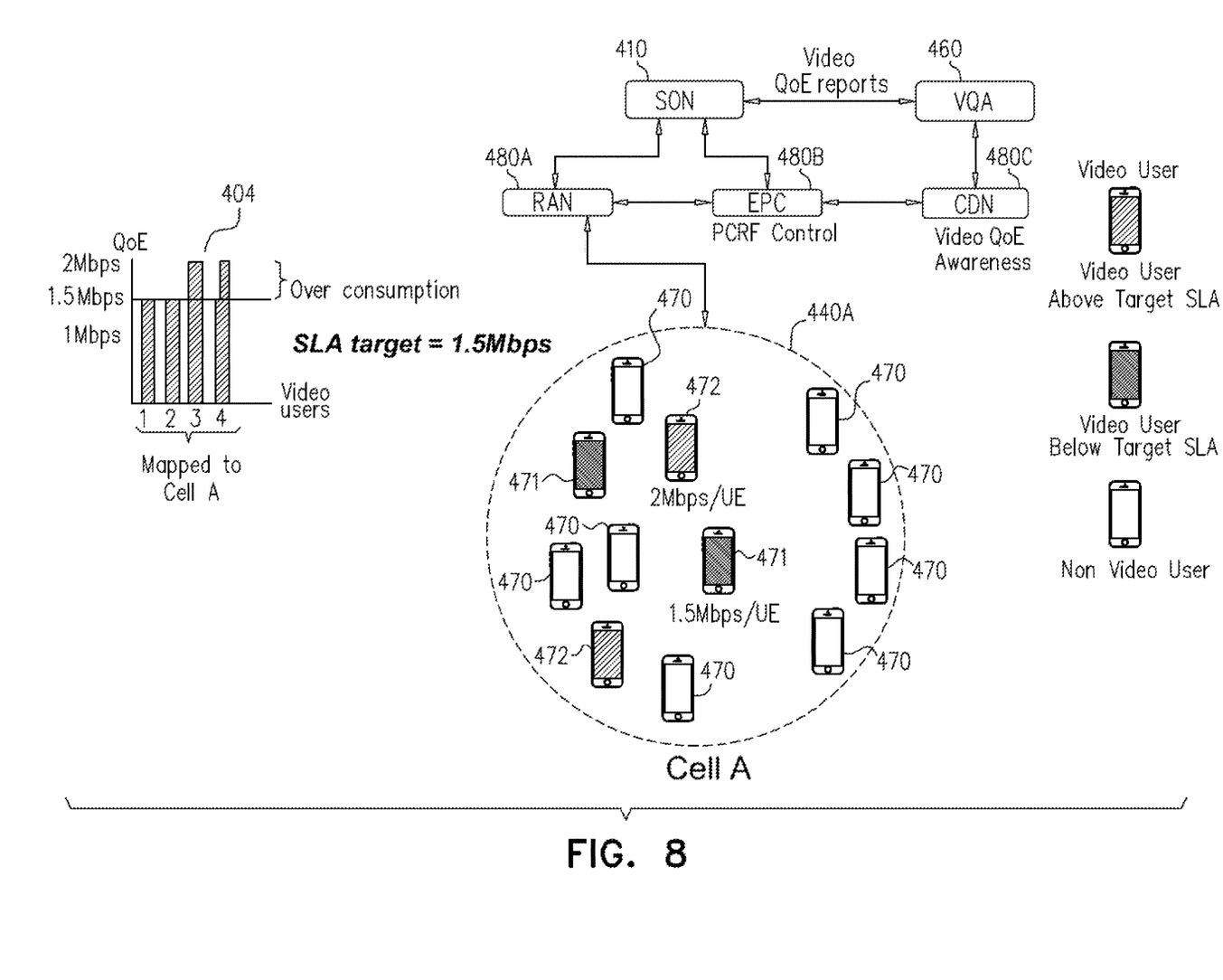

As depicted in FIG. 8, to which reference is now made, in accordance with embodiments described herein, based on information received from VQA 460 regarding CDN 480C, SON application 410 may shape traffic within RAN 480A (specifically cell 440A) via a standard policy control interface in EPC 480B (i.e., PCRF 420 as depicted in FIG. 4). For example, as shown in download rate graph 404, all of the UEs (e.g., 470, 471, and 472) may be limited by policy in PCRF 420 to a maximum of 2 Mbps in order to save some of the bandwidth previously used by UEs 472 exceeding the SLA and provide it to the UEs 471 experiencing poor QoE. SON application 410 may thereby improve Video QoE during congestion by applying policy-enforced fairness across video users. It will be appreciated that RAN 480A and EPC 480B are respectively analogous to domains 10A and 10C as depicted in FIG. 1; the embodiment of FIG. 8 therefore illustrates an example of action performed in one network domain 10 (i.e., changes in PCRF 420) that effectively remedy issues in a second network domain 10 (i.e. RAN 480A) in order to achieve a KQI target for a cross domain E2E service, i.e., video content delivery.

In accordance with other embodiments described herein, video QoE may be used by SON application 410 for feedback i.e. to evaluate changes caused by recent action performed by the algorithms employed by SON application 410. This may provide a quantifiable measure of the improvement that SON application 410 provides to an operator's networks.

It will be appreciated by a person of ordinary skill in the art that although the embodiments described herein may have been presented in the context of licensed spectrum SON, the same techniques may also be applied to SON applications managing an unlicensed spectrum, such as, for example, a video aware WiFi SON solution.

It will also be appreciated that existing video optimization over mobile solutions typically relies on in-line optimizers that operate in the data plane alone. Instead, video aware SON application 410 improves video QoE by making changes in the management plane (e.g., configuration) and/or control plane (policy changes).

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A method for cross-domain service optimization, the method implemented on a computing device and comprising:
    defining at least one key quality indicator (KQI) target for at least one end-to-end (E2E) service, wherein said at least one E2E service crosses more than one domain of a communications network;
    receiving an indication of insufficient quality of experience (QoE) for said at least one E2E service provided to at least a first user equipment (UE) in a first cell of said communications network;
    based on said indication of insufficient QoE, translating said at least one KQI target to at least one set of service optimization instructions for each domain from among said more than one domain; and
    for each said domain, applying said at least one set of service optimization instructions including for reshaping at least said first cell in terms of radio coverage in order to achieve said at least one KQI target for said at least one E2E service for said at least first UE by increasing radio resources available to said at least first UE, wherein increasing said radio resources includes applying policy control on a second UE in said first cell to reduce a maximum QoE for said second UE.

2. The method according to claim 1 and wherein said applying comprises:
    instructing a domain controller to apply said at least one set of service optimization instructions, wherein said at least one set of service optimization instructions are domain configuration parameters, and said domain controller is associated with a domain from among said more than one domain.

3. The method according to claim 1 and wherein said applying comprises:
    instructing a domain optimizer to apply said at least one set of service optimization instructions, wherein said at least one set of service optimization instructions are associated with at least one domain-specific key performance indicator (KPI) target for achievement of said at least one KQI target, and said domain optimizer is associated with a domain from among said more than one domain.

4. The method according to claim 3 wherein optimal domain performance is of lower priority for said domain optimizer comparatively to said achievement of said at least one domain-specific KPI target.

5. The method according to claim 1 and wherein said at least one E2E service is video content delivery, and said at least one KQI target is associated with a service level agreement (SLA) for said video content delivery.

6. The method according to claim 5 and wherein:
said receiving an indication of insufficient QoE further comprises receiving an indication of at least a second user equipment (UE) experiencing QoE exceeding said SLA in a second cell of said communications network, and said reshaping further comprises reshaping at least said second cell in terms of radio coverage in order to increase said radio resources.

7. The method according to claim 1 and wherein said at least one E2E service is a voice service over one of Long-Term Evolution (LTE) or WiFi.

8. The method according to claim 1 and wherein said at least one E2E service is cellular Internet of Things (CIoT).

9. The method according to claim 1 and wherein said more than one domain of the communications network is at least a radio access network (RAN) domain and at least one other network domain in said communications network is a Core Network.

10. A cross domain service optimization architecture comprising:
a multiplicity of network domains;
for each of said multiplicity of network domains, at least a domain controller or a domain optimizer operative to apply domain-specific service optimization instructions; and
an end-to-end (E2E) orchestration/optimization level operative to:
receive an indication of insufficient quality of experience (QoE) for an E2E, cross domain service provided to at least a first user equipment (UE) in a first cell of said multiplicity of network domains;
based on said indication of insufficient QoE, translate a set of key quality indicators (KQIs) for said E2E, cross domain service to said domain-specific service optimization instructions; and
instruct said at least a domain controller or a domain optimizer in each of said multiplicity of network domains associated with said E2E, cross-domain service to apply said domain-specific service optimization instructions in an associated domain including for reshaping at least said first cell in terms of radio coverage in order to achieve at least one KQI target for said E2E, cross domain service for said at least first UE by increasing radio resources available to said at least first UE, wherein increasing said radio resources includes applying policy control on a second UE in said first cell to reduce a maximum QoE for said second UE.

11. The architecture according to claim 10 and further comprising: one or more optimization applications operative to:
define said E2E, cross domain service and said set of KQIs;
set target values for said set of KQIs; and
provide said target values as KQI targets including said at least one KQI target to said E2E orchestration/optimization level.

12. The architecture according to claim 10 and wherein said at least a domain controller is operative to:
receive said domain-specific service optimization instructions as configuration parameters for said associated domain; and
configure said associated domain according to said configuration parameters.

13. The architecture according to claim 10 and wherein said at least a domain optimizer is operative to:
receive said domain-specific service optimization instructions as a target for at least one domain-specific key performance indicator (KPI) associated with said at least one KQI target; and
optimize said associated domain in order to achieve said target for at least one domain-specific KPI.

14. A non-transitory tangible medium storing software components that when executed by a computer, cause the computer to perform operations including:
defining at least one key quality indicator (KQI) target for at least one end-to-end (E2E) service, wherein said at least one E2E service crosses more than one domain of a communications network;
receiving an indication of insufficient quality of experience (QoE) for said at least one E2E service provided to at least a first user equipment (UE) in a first cell of said communications network;
based on said indication of insufficient QoE, translating said at least one KQI target to at least one set of service optimization instructions for each domain from among said more than one domain; and
for each said domain, applying said at least one set of service optimization instructions including for reshaping at least said first cell in terms of radio coverage in order to achieve said at least one KQI target for said at least one E2E service for said at least first UE by increasing radio resources available to said at least first UE, wherein increasing said radio resources includes applying policy control on a second UE in said first cell to reduce a maximum QoE for said second UE.

15. The non-transitory medium of claim 14, wherein the software components for applying include software components for:
instructing a domain controller to apply said at least one set of service optimization instructions, wherein said at least one set of service optimization instructions are domain configuration parameters, and said domain controller is associated with a domain from among said more than one domain.

16. The non-transitory medium of claim 14, wherein the software components for applying include software components for:
instructing a domain optimizer to apply said at least one set of service optimization instructions, wherein said at least one set of service optimization instructions are associated with at least one domain-specific key performance indicator (KPI) target for achievement of said at least one KQI target, and said domain optimizer is associated with a domain from among said more than one domain.

17. The non-transitory medium of claim 16, wherein optimal domain performance is of lower priority for said domain optimizer comparatively to said achievement of said at least one domain-specific KPI target.

18. The non-transitory medium of claim 14, wherein said at least one E2E service is a voice service over one of Long-Term Evolution (LTE) or WiFi.

19. The non-transitory medium of claim 14, wherein said at least one E2E service is cellular Internet of Things (CIoT).

20. The non-transitory medium of claim 14, wherein said more than one domain of the communications network is at least a radio access network (RAN) domain and at least one other network domain in said communications network is a Core Network.

\* \* \* \* \*